United States Patent

Hofmann et al.

[11] Patent Number: 5,764,049
[45] Date of Patent: Jun. 9, 1998

[54] SPEED OF ROTATION DETECTION DEICE FOR WHEEL BEARING

[75] Inventors: Heinrich Hofmann, Schweinfurt; Johannes Schottdorf, Hammelburg, both of Germany

[73] Assignee: FAG Automobiltechnik AG, Germany

[21] Appl. No.: 678,245

[22] Filed: Jul. 11, 1996

[30] Foreign Application Priority Data

Aug. 5, 1995 [DE] Germany .................. 195 28 872.6

[51] Int. Cl.⁶ .................. G01P 3/488; G01P 3/44; F16C 32/00; B60T 8/72
[52] U.S. Cl. .................. 324/173; 324/207.25; 384/448
[58] Field of Search .................. 324/173, 174, 324/207.22, 207.25; 384/448

[56] References Cited

U.S. PATENT DOCUMENTS 3,500,091  3/1970  Jones .
5,085,519  2/1992  Dougherty .................. 324/123

FOREIGN PATENT DOCUMENTS 1911513  11/1969  Germany .

*Primary Examiner*—Walter E. Snow
*Attorney, Agent, or Firm*—Ostrolenk, Faber, Gerb & Soffen, LLP

[57] ABSTRACT

A wheel bearing with a speed of rotation detection device, in particular for use on a motor vehicle. A sensor supported on the stationary bearing ring is opposite a pulse ring which is connected with and rotates with the rotating bearing ring. The pulse generating ring is developed as a spherical segment, spherical sector, or spherical zone, wherein the center point of its sphere is arranged at the tilt center point of the bearing. The sensor is concentric to the center point of the sphere and is opposite and spaced from the pulse ring by an air gap. The sensor may be concentric with or eccentric to the axis of rotation of the bearing ring. This develops the pulse generating ring and the sensor such that the change in the air that gap occurs as a result of static or dynamic loads on the bearing has no detrimental effect on the quality of the signal.

18 Claims, 3 Drawing Sheets

SPEED OF ROTATION DETECTION DEICE FOR WHEEL BEARING

BACKGROUND OF THE INVENTION

The present invention relates to a speed of rotation detection device for a vehicle wheel bearing and particularly to such a device which is accurate under various loads and upon tilting of the bearing.

Wheel bearings for motor vehicles frequently have a speed of rotation detection device, for instance, to generate signals for the control of an anti-lock braking system. The bearing includes a stationary ring, typically the outer ring, a rotatable ring, typically the inner ring, and rolling elements between the rings. A pulse generating ring is arranged on the rotating bearing ring. A sensor is fastened on the bearing housing or on the stationary bearing ring and opposite the pulse generating ring. There is an air gap between the sensor and the pulse generating ring. That gap should be as small as possible to assure the strength and quality of the signal.

Further details with respect to the basic manner of operation of speed detection devices are described in the article by Bayer entitled "A New Generation: ABS Capable Wheel Bearings," SAE Paper 910699 ISSN 0148-7191 of Feb. 25, 1991, or in Federal Republic of Germany OS 19 11 513 (Kelsey-Hayes).

During travel of a vehicle, static and dynamic loads are applied to the wheel bearings. These loads may tilt the bearing rings and may change the air gap, which would change the quality of the signal. Further, when the pulse transmitter ring scrapes against the sensor, the sensor can be destroyed. On the other hand, the safety spacing of the air gap should not be too great in view of the signal yield.

SUMMARY OF THE INVENTION

In wheel bearings of the above type, it is an object of the invention to develop the pulse generating ring in the sensor so that the change in the air gap caused by static or dynamic loads, which can cause relative tilting of the bearing rings, does not have a detrimental effect on the quality of the signal, and so that a simple, inexpensive construction of the speed detection device is possible.

The invention concerns a wheel bearing with a speed of rotation detection device, in particular for use on a motor vehicle. A sensor supported on or stationary with respect to the stationary bearing ring is located opposite a pulse ring which is connected with and rotates with the rotating bearing ring. The pulse generating ring is developed as a spherical segment, spherical sector, or spherical zone, wherein the center point of its sphere is arranged at the tilt center point of the bearing. The sensor is concentric to the center point of the sphere, is opposite the pulse ring and is spaced from the pulse ring by an air gap. The sensor may be concentric with or eccentric to the axis of rotation of the bearing ring. This develops the pulse generating ring and the sensor such that the change in the air gap that occurs as a result of static or dynamic loads on the bearing has no detrimental effect on the quality of the signal.

The pulse generating ring is a spherical segment or spherical zone with the center of the sphere lying at the center of the bearing. The sensor is concentric in the tilt resting point of the bearing. As a result, sags and elastic deformations of the wheel bearing do not have any effect on the quality of the signal. Nevertheless, simple and inexpensive detection of the speed of rotation is obtained.

In addition, the wheel bearing is effectively sealed by an at least partially hemispheric cap over the end of the rotating inner bearing ring, which supports the pulse generating ring, and/or there is such a cap over the stationary outer bearing ring, which supports the sensor. The sensor is supported either on or off the axis of the bearing, but on the center of the spherical segment. The expression spherical zone is used below in general for all shapes of spherical segments including hemispherical segments, spherical zones, spherical cones, etc.

Other features and advantages of the present invention will become apparent from the following description of an embodiment of the invention which refers to the accompanying drawings.

DETAILED DESCRIPTION OF EMBODIMENTS OF THE INVENTION

Figure 1:
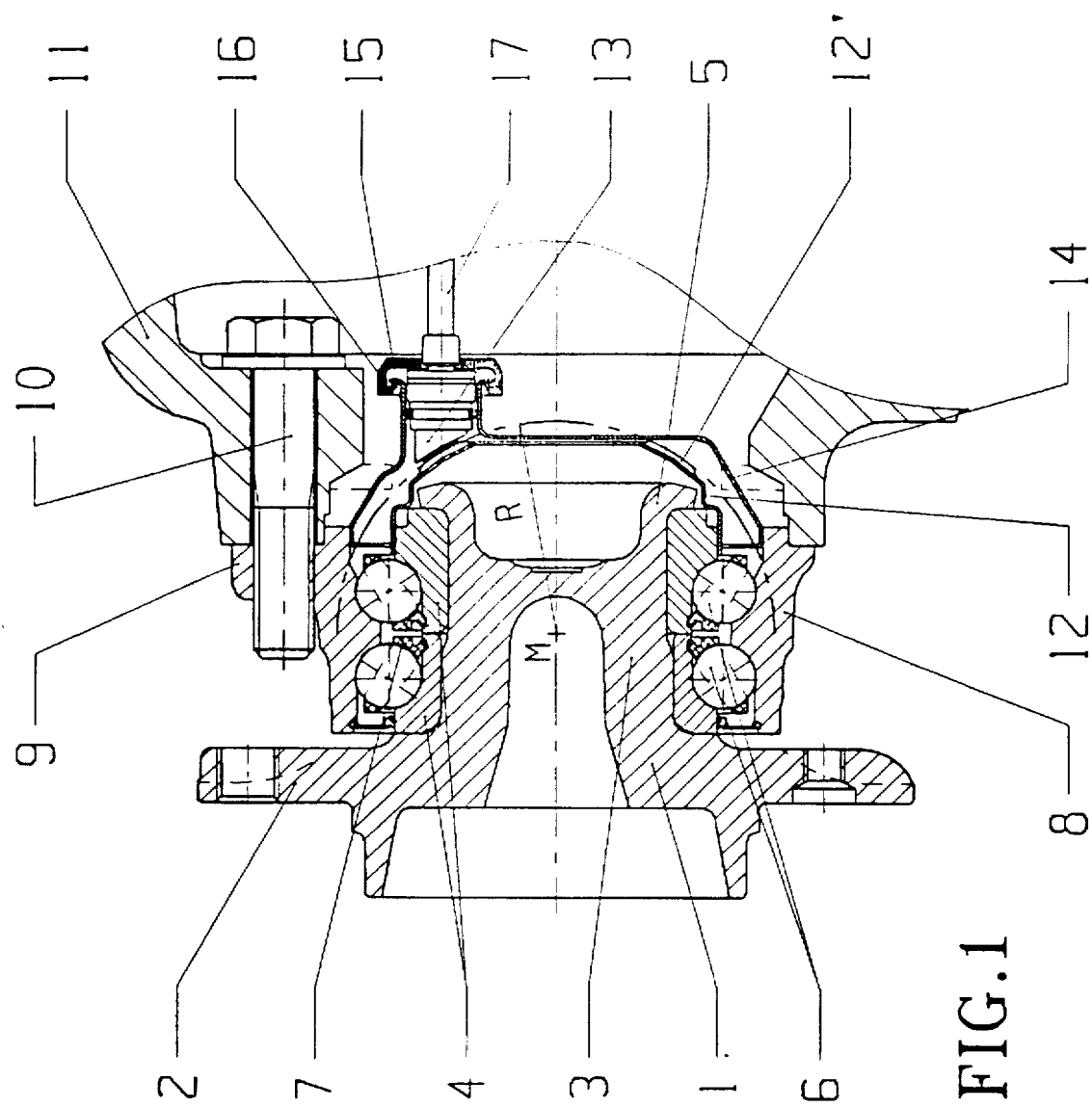
FIG. 1 shows a cross section of a wheel bearing having a sensor that is arranged outside the axis of the bearing and having a pulse ring developed as a partial hemispherical cover cap.

In FIG. 1, the wheel carrier or hub 1 supports the wheel bearing 1. The carrier has a flange 2 for attachment to a wheel rim (not shown). On its shoulder 3, the carrier 1 receives two axially neighboring inner rings 4 of the two row bearing. The inner rings 4 are clamped on the shoulder 3 by a plastically deformed bead 5 extending around the end of the shoulder. The bearing further comprises two rows of bearing balls 6, the separators or cage 7, and the outer ring 8, which is of one piece. The outer ring 8 has a flange 9 which is fastened by bolts 10 to the vehicle 11. The carrier 1 may be tilted with reference to the outer ring 8 upon application of a dynamic or static load. Such tilting is usually around the general center M of the spherical zone, described below, which is generally at the middle of the bearing.

For detecting the speed of rotation of the bearing, a pulse generating ring 12 is pressed on the rotating inner ring 4 and rotates along with the inner ring 4 with reference to the outer ring 8 and the bearing housing. The pulse generating ring is developed as a generally spherical zone. Its one or annular array of several regions 12' generates pulses with varying sections as seen in the circumferential direction. The regions 12' may be serrated or undulated, may include magnets, may be provided with magnetizable sections, or may have recesses which periodically change the continuous magnetic flow so that this change is recorded by the sensor 13.

For sensing that the regions 12' are rotating past it, a sensor 13 is arranged opposite the regions 12' and is contained in a large surface sensor housing 14 that covers over the end of the shoulder 4 and the bead 5. The housing has a sensor receiver 15 in which the sensor 13 is held fast, for instance, by means of a holding cap 16. The signal generated by the sensor is conducted via a connecting cable 17 to a signal processor (ABS processor), not shown.

The regions 12' are developed as a spherical zone with its spherical center M in the middle of the bearing. As a result, sags and tilts resulting from loads on the bearing have no influence on the air gap between the sensor 13 and the pulse generating ring 12. Upon tilting of the shoulder 3 and the ring 12 with reference to the sensor 13, the regions 12' move along an imaginary spherical zone surface having the radius R, and the distance of the region 12 from the sensor remains the same.

Figure 2:
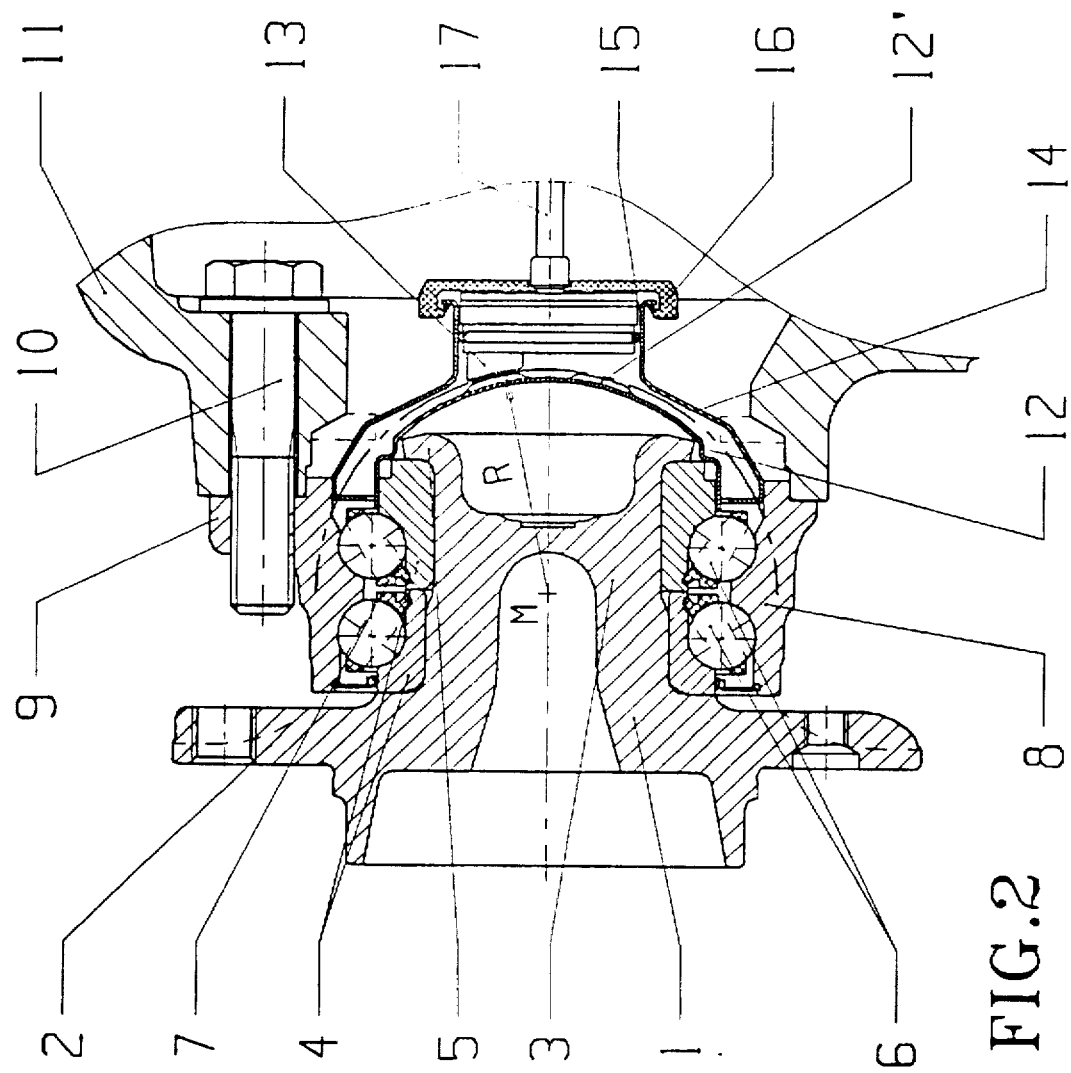
FIG. 2 shows a cross section of a wheel bearing having a sensor housing that is arranged concentric to the axis of the bearing and having a pulse ring developed as hemispherical cover cap.

FIG. 2 shows an embodiment similar to that shown in FIG. 1, but in which the pulse generating ring 12 and the sensor receiver 15 are arranged concentric with the center M of the sphere and along the rotation axis of the bearing. Here, also, the center M of the sphere is located at the tilt center point of the bearing, which is generally at the middle of the bearing, while the sensor 13 is arranged in the tilt rest point. The regions 12' are again so arranged in a spherical zone with the radius R that the regions are opposite the sensor 13. The sensor housing 14 serves at the same time as a protective cap and a seal for the wheel bearing.

Figure 3:
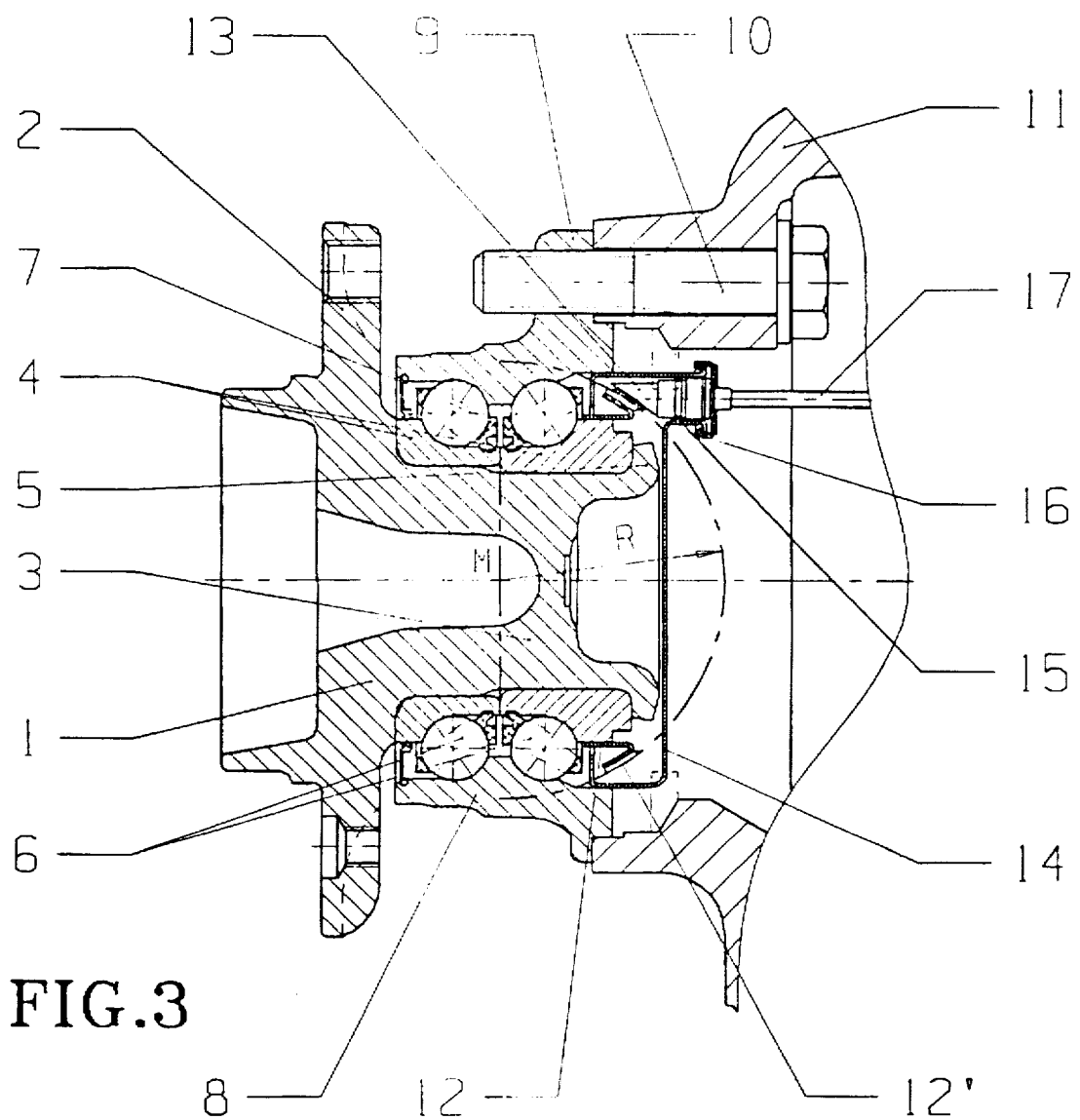
FIG. 3 shows a cross section of a wheel bearing having a sensor that is arranged outside the axis of the bearing and having a pulse ring that is developed as a narrow spherical zone.

The embodiment shown in FIG. 3 has a particularly space saving arrangement of the pulse transmitter ring 12 and the sensor 13. The pulse generating ring comprises a simple sheet metal part having merely a narrow spherical zone which supports only the region 12'. It is a spherical region in that it is centered on the center M of the tilt of the bearing. This design enables the sensor housing 14 to also be developed axially in a space saving manner. The region 12' is larger in its spherical dimensions than the sensor 13 only by the amount of the swing or tilt which is to be expected.

The sensor 13 is stationary in the wheel bearing with reference to the rotation of the pulse ring 12. Hence, the sensor can be supported in the stationary bearing housing or in the stationary outer ring of the bearing which is supported stationary in the bearing housing.

The invention is not limited to the type of wheel bearings shown but can also be used with tapered roller bearings, bolted wheel bearings or in the case of rotating outer rings. Furthermore, plastic caps can be used instead of sheet metal parts for the pulse ring 12 and the sensor housing 14.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheel bearing including a speed of rotation detection device, wherein:

the bearing includes a stationary bearing ring, a rotatable bearing ring, which is rotatable with reference to the stationary bearing ring, rolling elements between the bearing rings;

the wheel bearing having a general center of tilt about which the bearing tilts;

the detection device comprises:

a sensor for sensing the passage of a pulse transmitter ring, the sensor being supported to be stationary with reference to the stationary bearing ring;

a pulse transmitter ring supported for rotation with the rotating bearing ring, the pulse transmitter ring including is at least a segment thereof which segment is approximately a generally spherically shaped spherical zone, and the generally spherically shaped spherical zone has a center which is approximately at the center of tilt of the wheel bearing; and means in the bearing supporting the sensor opposite the segment of the pulse transmitter ring and spaced by a gap from the generally spherically shaped spherical zone of the pulse transmitter ring, the bearing rings being supported so that the gap remains substantially constant if there is relative tilting of the bearing rings around the center of tilt.

2. The wheel bearing of claim 1, wherein the sensor is concentric to the center of the sphere of which the spherical zone is a part.

3. The wheel bearing of claim 1, wherein the bearing has a middle and the center of the spherical zone is generally at the middle of the bearing.

4. The wheel bearing of claim 2, comprising a housing for the sensor, the housing being concentric to the center of the sphere; the bearing having an axis of rotation which passes through the center of the sphere, and the sensor housing being concentric with the axis about which the rotating bearing ring rotates.

5. The wheel bearing of claim 2, wherein the bearing has an axis about which the rotating bearing ring rotates, and the sensor is eccentric to the axis, while being concentric to the center of the sphere.

6. The wheel bearing of claim 1, wherein the pulse generating ring comprises a cover cap over the rotating bearing ring.

7. The wheel bearing of claim 6, wherein the cover cap is at least partially hemispherical.

8. The wheel bearing of claim 7, wherein the bearing has an inner ring which is the rotating bearing ring and the pulse generating ring is rotatable with the inner ring; the bearing having an outer ring which is the stationary ring.

9. The wheel bearing of claim 6, wherein the second cover cap is comprised of sheet metal.

10. The wheel bearing of claim 1, further comprising a cover cap over the stationary ring of the bearing.

11. The wheel bearing of claim 10, wherein the sensor is supported on the cover cap.

12. The wheel bearing of claim 11, wherein the cover cap supporting the sensor is comprised of sheet metal.

13. The wheel bearing of claim 11, wherein the pulse generating ring comprises a second at least partially hemispherical cover cap over the rotating bearing ring.

14. The wheel bearing of claim 13, wherein the bearing has an inner ring which is the rotating bearing ring and the pulse generating ring is rotatable with the inner ring; the bearing having an outer ring which is the stationary ring.

15. The wheel bearing of claim 11, wherein the bearing has an inner ring which is the rotating bearing ring and the pulse generating ring is rotatable with the inner ring; the bearing having an outer ring which is the stationary ring.

16. The wheel bearing of claim 1, wherein the bearing has an inner ring which is the rotating bearing ring and the pulse generating ring is rotatable with the inner ring; the bearing having an outer ring which is the stationary ring.

17. The wheel bearing of claim 16, wherein the inner ring is tiltable with reference to the outer ring generally about the center of the tilt.

18. The wheel bearing of claim 1, wherein the rotating bearing ring with the pulse transmitter ring supported thereon is rotatable with reference to the stationary bearing ring generally around the center of the spherical zone.

* * * * *